June 16, 1953  R. C. RUSSELL  2,642,048
VALVE OPERATING MECHANISM
Filed Jan. 5, 1951  2 Sheets-Sheet 2
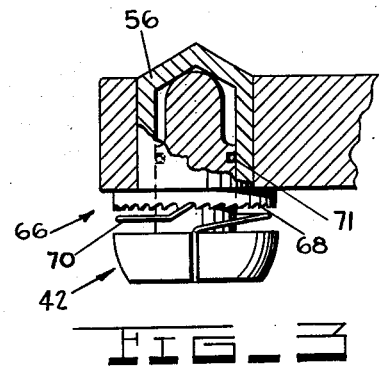
FIG_3
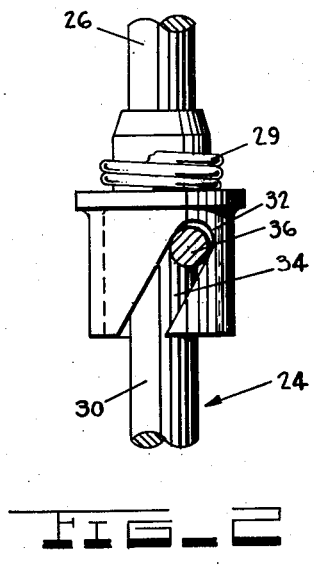
FIG_2
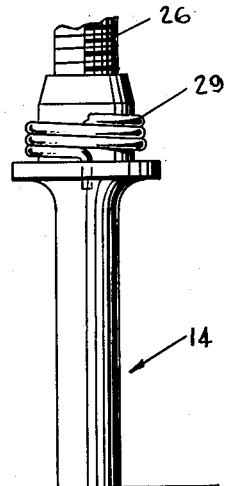
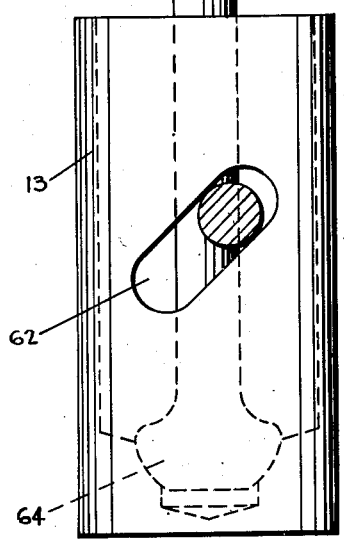
FIG_4
INVENTOR.
ROBERT C. RUSSELL
BY
McDonald & Fagus
ATTORNEYS Patented June 16, 1953

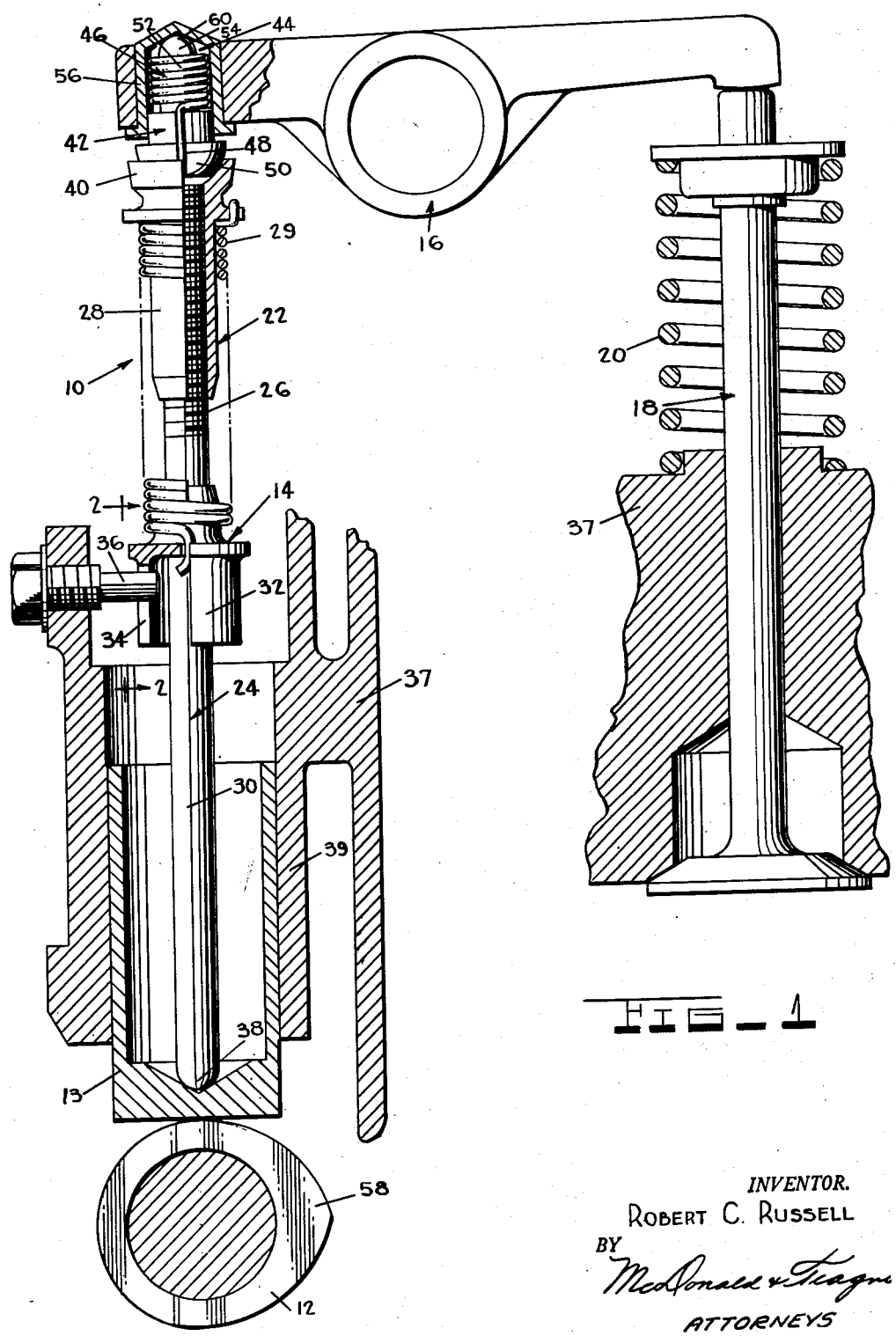
FIG_1

2,642,048

UNITED STATES PATENT OFFICE 2,642,048

VALVE OPERATING MECHANISM

Robert C. Russell, Euclid, Ohio, assignor to Eaton Manufacturing Company, Cleveland, Ohio, a corporation of Ohio Application January 5, 1951, Serial No. 204,590

11 Claims. (Cl. 123—90)

This invention relates to valve operating mechanism for internal combustion engines and the like and more particularly to means for automatically compensating for variations in length of the operating components of said mechanism.

Broadly the invention comprehends the provision of a valve operating mechanism comprising the related components thereof viz. cam, tappet, push rod, rocker arm and valve, having means in the form of a torsion-spring-tensioned screw and nut member assembly incorporated therein and wherein one of said members is moved with predetermined oscillation and the other member is free to rotate in one direction but restrained from rotation in the opposite direction during an operating cycle thereof, said means affecting an automatic length compensation of the mechanism in the course of operation thereof.

Although numerous means both hydraulic and mechanical have been devised for the sole and express purpose of accomplishing an automatic compensation of length adjustment in the co-operative operating elements of a valve operating mechanism to correct for whatever expansion or contraction and wear occurs therein during operation, none have satisfactorily entirely attained the desired results. Through the utilization of the presently devised structure an assured and proper automatic mechanical adjustment is obtainable under all normal conditions of operation and without regard to temperature, dirt, etc.

Among the objects of the invention is the provision of valve operating mechanism having automatic mechanical length adjusting means incorporated therein that is simple of construction, economical to manufacture and effective in operation; that assures an automatic adjustment of the valve operating mechanism under all normal conditions of operation such as relates to speed, wear, temperature, contamination, expansion and contraction and etc.; that can be designed with predetermined lift loss introduction over a wide range; that incorporates a screw and nut member assembly normally biased apart by a torsion spring, means for oscillating one of the members through a predetermined path and one-way brake means engageable with the other member permitting rotation thereof in one direction while restraining rotation in the other direction during the actuation of the valve operating mechanism; that is not subject to excessive wear thus permitting of an extended, service-free life thereof; that introduces and maintains a positive lift loss into the valve operating mechanism during each cycle of operation thereof and provides for a positive removal of the lift loss or a portion thereof at the completion of each cycle of operation to insure a seating of the valve under all conditions of expansion, contraction and wear and simultaneously restored zero clearance in the mechanism; and that does not require the manufacture thereof with precise tolerances thereby permitting the making of a standard size adaptable to a great range of length adjustability both as to initial installation use and operation.

Other objects and advantages of the invention will appear from the following description taken in connection with the drawings forming a part of the specification; and in which:

Fig. 1 is a partially elevational, partially cross-sectional view of a valve operating mechanism embodying the invention;

Fig. 2 is a cross-sectional view taken substantially along lines 2—2 of Fig. 1;

Fig. 3 is a fragmentary cross-sectional view of the rocker arm of Fig. 1 with a modified form of one-way brake means incorporated therein; and Fig. 4 is a fragmentary modified structure from that shown by Fig. 1 wherein oscillation is imparted directly to the tappet and thereby to the rod.

The valve operating mechanism incorporating structure therein effective to automatically compensate for any expansion, contraction and wear in the operating length of the mechanism which is simple, economical and effective in operation was devised for the purpose of eliminating the shortcomings of previously devised structures for the same purpose. In making the automatic length compensation structure mechanical, the problems such as dirt, temperature, leak down when not in operation and etc., that have to be seriously contended with in a hydraulic structure are here dispensed with. Furthermore, although a multitude of mechanical adjusters have been developed none are known to have eliminated all the problems confronted to so provide a virtually trouble free dependable structure as herein devised wherein the provision for lift loss as established can be assuredly maintained throughout each and every cycle of operation of the valve operating mechanism.

This improved automatic length compensation structure as incorporated in a valve operating mechanism of an internal combustion engine comprises basically a screw member, a nut member engageable with the screw member for movement relative thereto, a torsion spring interconnected between the screw and nut members normally biasing them apart, means for oscillating one of the members in a predetermined path during the longitudinal or axial movement thereof and one-way brake means engageable with the other member for restraining the rotation thereof in one direction while permitting rotation thereof in the opposite direction, during a valve operating cycle. A predetermined lift loss of the structure is had dependent on the cam lift or longitudinal movement of the structure, the thread lead between the members and the degree of oscillation, and is attained preferably upon a valve lifting or opening cycle wherein as the one member is oscillated or turned and longitudinally moved, it moves relatively to the other member shortening the overall length thereof by the lift loss provided. This shortening in length of the adjusting structure is possible due to the fact that the one-way brake restrains rotation of the member engageable therewith, and as a consequence the members are relatively threaded toward one another.

During the valve closing operation, as the adjusting structure is reversely moved longitudinally, the member which was turned in one direction is reversed in direction to complete an oscillation cycle thereof and simultaneously therewith it attempts to be moved threadingly away from the other member. At this stage of operation in view of the load of the valve spring acting upon the valve operating mechanism and adjusting structure elongation of the screw and nut member assembly is resisted such that through the permissibility of the one-way brake means and the fact that the turning resistance at the threads between the screw and nut assembly is greater than turning resistance on the member engageable with the one-way brake means the member engageable therewith turns freely and moves jointly with the member which is oscillated. Upon the seating of the valve and the release of the valve spring load from the valve operating mechanism and the adjusting structure the torsion spring interconnecting the screw and nut assembly acts to cause a relative threading, outward biasing action between the screw and nut members effective to take up clearance in the mechanism either as a result of said lift loss introduction or through contraction in the length of the mechanism, and thus reestablish zero clearance for the valve operating mechanism with the valve seated. Should expansion of the mechanism have occurred during the operation thereof the lift loss will be ample to account therefor and will have the amount of expansion deducted therefrom such that upon seating of the valve the push rod will be extended by the torsion spring to take up the resultant clearance in the mechanism.

The provision of the one-way brake means provides for the assured lift loss introduction by the screw and nut member assembly for each cycle of valve operation thereby providing a rapid and accurate adjustment of the valve operating mechanism whether an expansion or contraction thereof occurs.

The adjusting structure can take any of several forms and become a part of almost any or all of the members of the valve operating mechanism dependent on availability of space, component members required to make up the valve operating mechanism, etc. One form of structure as embodied cooperatively in the push rod and rocker arm of a valve operating mechanism includes a threadingly engaged nut and screw member assembly constituting the push rod and a one-way brake device as a part of the rocker arm having engagement with one of the members of the nut and screw member assembly. A torsion spring is interconnected between the threadedly connected members of the assembly normally biasing them apart and one of the members is provided with a cam slot adapted upon longitudinal or axial movement thereof to be turned through a prescribed number of degrees upon engagement with a stationary pin or the like. The cam slot is so angularly disposed and the threads of the assembly are of such hand that a preferable threading up or length shortening operation of the push rod is accomplished when the push rod is moved longitudinally upward as by a cam. A positive threading up of the assembly is possible inasmuch as the brake means operates to restrain the member of the assembly engageable therewith from rotation. This braking action is accomplished by providing a greater frictional resistance to rotation between the engagement surfaces of the brake means and one member of the threaded assembly, than the resistance at the threads of the assembly.

One form of brake means includes a cylindrical spring permitting upon engagement with a stationary part of the rocker arm rotation in one direction and restraining it in the opposite direction. After a valve lifting or upward movement of the push rod has occurred and the push rod has been shortened a positive lift loss amount, a downward movement of the push rod assembly results in the member, having the cam slot therein, through engagement with the stationary pin, to be reversed in its turning movement such as to normally cause a movement apart of the nut and screw assembly. This movement apart cannot occur because the load of the valve spring returning the valve to its seat acts through the valve operating mechanism so as to impose its load throughout the chain of engagement of the component members thereof and thus resist a lengthening action of the push rod. The brake means being ineffective in this direction of rotation and all functional friction points being of a higher order than that of the end point of the push rod assembly, the push rod assembly rotates as a unit retaining the introduced lift loss just short of the downward end position thereof wherein the valve becomes seated, and the valve spring load is removed from the valve operating mechanism, and the torsion spring between the members of the threaded assembly operates to take up any clearance that may be present in the mechanism at the completion of a full cycle of operation. The lift loss provided by the push rod shortening during each cycle of operation will account for any amount of expansion likely to occur, and hence, will insure proper seating of the valve. Many variations in structure of the valve operating mechanism is possible without departing from the basic fundamental of operation of the aforesaid defined specific structure just so long as oscillation of one member of the screw and nut assembly is positively oscillated and the other member is alternately restrained from rotation and then free for rotation.

Referring to the drawings for more specific details of the invention 10 represents generally a valve operating mechanism comprising as component members thereof a cam 12, a tappet 13, a push rod assembly 14, a rocker arm 16 and a valve 18.

The valve operating mechanism as will be noted by Fig. 1 is in a state of rest wherein the cam has just moved to its base circle and the valve spring 20 is holding the valve in closed position on its seat. Through the provision of automatic length compensating mechanism 22 incorporated jointly in the push rod and the rocker arm the component members of the valve operating mechanism are maintained in series engagement relation.

The push rod assembly 14 includes a preferably slender screw element 24 having a screw threaded portion 26 on one end thereof, a nut element 28 threadingly engageable upon the screw threaded portion of element 24 and a torsion spring 29 interconnected between the nut and screw elements.

The screw element includes in addition to the screw threaded portion 26, an opposite axially extended portion 30 and an enlarged portion 32 axially intermediate the threaded and axially extended portions of the screw element.

The enlarged portion 32 of the screw element is in the form of a skirt welded or otherwise fixedly secured to the screw element and is provided with a predetermined angular cam slot 34 adapted for engagement with a stationary pin 36 or the like fixedly secured in a suitable wall of an internal combustion engine block 37, the purpose of which will hereinafter appear. The cam slot as shown by Fig. 1, is of a selected angularity such that upon an upward movement of the screw element as caused by a lifting action of the cam 12 and as transmitted thereto by the tappet engaging the extremity 38, of the extended portion of the screw element, disposed within the tappet 13 a clockwise turning movement will be imparted thereto. The tappet 13 as will be noted is supported for reciprocable guided arrangement in a tappet guide 39 formed in the engine block 37.

The spring 29 is so arranged in telescoping relation to the threaded portions of the nut and screw elements with its opposite ends fixed respectively in the nut and screw elements effective to normally bias the nut and screw elements apart to the extent of its torsionally operative length.

A spherically shaped socket 40 is provided in one end of the nut element adapted to receive in engagement in the spherical cavity thereof a spherical shaped button member 42 of a brake device 44.

The brake device 44 in addition to the button member 42 includes a coiled spring member 46 having one end 48 fixed in the head 50 of the button member and its other end 52 freely disposed about an axial extension 54 of the button member upon which the spring is telescoped and a bushing or rocker arm insert 56 upon the inner wall of which the spring is adapted to bear and effect a braking action for one attempted direction of rotation of the button. The spring member 46 as shown by Fig. 1, is arranged so that upon attempted clockwise rotation of the button the spring is expanded into locking engagement on the wall of the insert.

The insert 56 is pressed or otherwise fixedly secured in one end of the rocker arm as to form an abutment for the spring, although a properly designed cavity in the rocker arm could serve a like purpose.

It is to be noted that the area of engagement between the socket and button occurs at a radius point further from the axis of the push rod than the pitch diameter of the threads of the screw and nut assembly so as to offer greater torsional resistance to movement than exists at the lesser thread pitch radius. The paramount condition regardless of radius comparison frictional points of the threads of the assembly and the engagement of the button and one member of the threaded assembly is that the torsional resistance to movement between the one member and the button exceeds that of the threaded nut and screw elements.

As disclosed by Fig. 1 of the drawing, the screw and nut elements are threaded right-hand so as to provide for a desired condition of operation dependent upon the angularity of the cam slot 34 and the clockwise braking action of the brake device.

Through the provision of the one-way brake means assuring a restrainment of rotation of the nut member of the screw and nut assembly in one direction the threads of said assembly can vary as to threads per inch and/or helix angle over a wide range just so long as the helix angle is not so great as would cause a reversibility of relative movement between the respective members of the assembly.

A lift loss operation of the adjusting mechanism can be obtained through a related calculation of the cam lift, push rod thread lead, and the diameter of the enlarged portion of the screw element at which the camming action occurs.

In the operational set up of the mechanism as shown by Fig. 1, the rocker arm is so disposed to the valve and push rod whereby the axis of the brake device is angularly offset to the axis of the push rod and attains coaxiality therewith when the valve is half open.

Assuming the component members of the valve operating mechanism to be in the position shown by Fig. 1 upon the rotation of the cam 12 and engagement of the lift lobe 58 with the tappet 14, a lifting or upward movement of the tappet results effecting a longitudinal or axial movement of the screw element of the push rod. As the push rod is moved longitudinally the engagement of the cam slot with pin 36 causes a turning of the screw element clockwise. A clockwise as well as longitudinal movement of the screw element effects a transmission of motion therefrom by way of the threaded engagement thereof to the nut element. The nut member moves longitudinally to impart the longitudinal motion transmitted thereto to the rocker arm for subsequent delivery therefrom to open the valve. Rotation of the nut is resisted by way of the button of the brake device acting to resist its turning since an attempted clockwise rotation of the button instantaneously expands the spring into locking engagement on the wall of the insert and the resistance to movement between the engageable spherical surfaces of the button and nut element exceeds the added friction forces between the threads of the nut and screw elements and the torsion load of spring 29. As a consequence of the resistance to rotation of the nut element in a clockwise direction the screw is caused to thread into the nut and thus shorten the assembly thereof by a predetermined established amount dependent upon the positive lift loss desired.

As the cam is rotated over the peak thereof a lowering operation of the tappet, push rod and valve occurs as occasioned by the valve spring operating by way of the valve to transmit its force through the series engageable members of the valve operating mechanism. Upon the push rod being lowered the screw element thereof through the engagement of the cam slot 34 and pin 36 is turned counter-clockwise in a reverse direction to that when the push rod was raised, thereby acting through the threaded engagement between the screw and nut elements tending to screw relatively to the nut element and thus extend the push rod. This relative outward movement of the nut element to the screw element does not occur at this time because of the longitudinal force of the valve spring 20 being imposed on the nut element through the rocker arm resisting elongation of the assembly. Inasmuch as the force imparted from the screw element to the nut element by way of the threaded engagement therebetween is in a counter-clockwise direction, the button engageable by the nut element is released from clockwise braked engagement. With the friction between the threads of the nut and screw elements and the friction between the button and nut element being in excess of the friction at 60 on the extremity of the button engaging the inner end wall of insert 56 as induced by the valve spring load and with the spring 46 being contracted, the nut element is caused to turn counter-clockwise with the screw thus retaining the push rod at shortened length as it was so adjusted during the upstroke thereof.

After the cam 12 is rotated through an opening and closing cycle of the valve, the valve spring operates to seat the valve since the lift loss will account for all expansion occurring in the operating mechanism. With the load of the valve spring 20 removed from the valve operating mechanism as the cam reaches its base circle and with say the lift loss operation of the push rod existing in the mechanism, the torsion spring 29 will operate to move the nut element out from the screw element in an extension operation of the push rod to take up any clearance in the mechanism and thus once again provide zero clearance as represented by Fig. 1 of the drawing. The torsion spring 29 will account on each and every cycle of valve operation to take up for any and all clearance that occurs in the mechanism.

Under conditions of elongation of the valve or other component members of the valve operating mechanism due to thermal expansion, the push rod lift loss adjustment would operate to account therefor on each and every cycle of operation to insure a seating of the valve and a compensation for clearance remaining in the mechanism.

Fig. 4 illustrates an alternate means of providing oscillation of the screw element of the push rod by arranging a cam slot 62 in the body of the tappet engageable in a like manner to the cam slot in the portion 32 of the screw element 24 of the push rod of Figs. 1 and 2 and as a substitution therefor. With the cam slot 62 in the tappet the push rod is provided with an enlarged or bulbous end 64 such that as it is received in the tappet sufficiently high friction is obtained therebetween insuring its movement therewith.

Fig. 3 is an alternate form of one-way brake means 66 to be employed in place of the one-way brake means 44 of Fig. 1 wherein insert 56 is provided with ratchet teeth 68 adapted to be engaged by a spring finger member 70 having one end anchored in the button 42 and its other end engaging the ratchet teeth. As noted the member 70 is so coiled about the button and engageable with the teeth 68 as to resist relative rotation in one direction between the button and stationary insert 56 while at the same time permitting relative rotation in the opposite direction. The teeth 68 are of such circumferential width as to insure a relative rotative movement of the button in the insert when the push rod assembly is lowered as to move a distance across one tooth width. The movement of the button is assured by the lift loss turning movement of the screw element of the push rod assembly which is in turn transmitted to the button by way of the nut element. An annular spring 71 is arranged in the body of the button engageable with the wall of the cavity in insert 56 for independently holding the button from dropping out of assembly therein.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A valve operating mechanism comprising threadingly engaged screw and nut members and a non-rotatable member, a spring normally biasing said screw and nut members apart, means for oscillating one of said screw and nut members, and one-way brake means engageable with the other of said screw and nut members, said brake means including a rotatable member and a holding member engageable between the rotatable member and said non-rotatable member and said rotatable member of the brake means being frictionally engageable with the other of said screw and nut members.

2. A valve operating mechanism comprising a push rod including threadingly engaged screw and nut members, a spring normally biasing the members apart, means for oscillating one of said members and a rocker arm having one-way brake means incorporated in one end thereof, said brake means including a rotatable member having a spherical surface at one end engageable upon the bottom wall of a cavity in the rocker arm and a spring having a portion engageable with the rotatable member and having another portion of it engageable with the rocker arm and the one of said screw and nut members which is not oscillated being frictionally engageable upon one end of the rotatable member opposite the spherical surface end thereof.

3. A mechanism according to claim 1 wherein the rotatable member of the brake means is rotatable in only one direction and wherein the spring member of the brake means is engageable with the non-rotatable member upon attempted rotation of the rotatable member of the brake means in one direction to resist rotation thereof.

4. A mechanism according to claim 3 wherein the spring member is coiled about the rotatable member of the brake means with one end thereof fixed to the rotatable member and has its external peripheral surface in torsioned engagement upon an internal wall of the non-rotatable member.

5. A mechanism according to claim 1 wherein the spring member acts as a pawl having one end fixed to the rotatable member and engageable at its free end upon a ratchet formed as part of the non-rotatable member.

6. A mechanism according to claim 2 wherein the engageable surfaces of the rotatable member and one of said screw and nut members are spherically complementary and provide a greater turning resistance therebetween than the turning resistance between the threads of the screw and nut members and wherein the turning resistance between the rotatable member and one of said screw and nut members and between the threads of the screw and nut members is greater than the turning resistance between the one spherical end of the rotatable member and the bottom wall of cavity in the rocker arm.

7. A mechanism according to claim 6 wherein the other of said screw and nut members from that engageable with the rotatable members is a tappet and the one of said screw and nut members engageable with the tappet has cam means in a portion of its body engageable by stationary means constituting the oscillating means for oscillating the one of said screw and nut members.

8. A valve operating mechanism comprising threadingly engaged screw and nut members, a spring normally biasing the members apart, means for oscillating one of said members, and one-way rotational movement controlling brake means engageable with the other of said members, said brake means having a relatively greater holding effectiveness on said other member for the shortening direction of a relative rotary movement between said members than for the lengthening direction of a relative rotary movement between said members.

9. A valve operating mechanism comprising threadingly engaged screw and nut members, a spring normally biasing the members apart, means for oscillating one of said members, and one rotative direction braking and a reverse rotative direction releasing means having a part engaged with the other of said members, the last mentioned means being effective to hold said other member to provide for a shortening of said mechanism during a rotary movement of said one member in one direction and being effective to release said other member for rotary movement of said one member in the opposite direction.

10. In a valve operating mechanism, a valve engageable part, threadingly engaged screw and nut members, a spring normally biasing said members apart, means for oscillating one of said members, and brake means operable between one of said members and said valve engageable part, said brake means having greater holding effectiveness on said one member for rotary movement thereof in one direction than in the other, effective to hold said one member to provide for a shortening of said mechanism and being effective to release said one member for rotary movement of said other member in the opposite direction.

11. In a valve operating mechanism, a valve engageable part, threadingly engaged screw and nut members, a spring normally biasing said members apart, means for oscillating one of said members, thrust bearing means between one of said members and said valve engageable part and providing for relatively free rotation of said one member in one direction, and brake means operable between said valve engageable part and said one member and resisting rotation of the latter in the opposite direction, effective to hold said one member to provide for a shortening of said mechanism.

ROBERT C. RUSSELL.

References Cited in the file of this patent

UNITED STATES PATENTS

| Number | Name | Date |
|---|---|---|
| 1,930,261 | Berry | Oct. 10, 1933 |
| 2,406,817 | Engemann | Sept. 3, 1946 |
| 2,419,316 | Engemann | Apr. 22, 1947 |